United States Patent [19]

Anderson

[11] Patent Number: 4,574,312
[45] Date of Patent: Mar. 4, 1986

[54] MAGNETO-OPTIC IMAGE SCANNING DETECTOR

[75] Inventor: Robert H. Anderson, Long Beach, Calif.

[73] Assignee: Litton Systems, Inc., Beverly Hills, Calif.

[21] Appl. No.: 375,329

[22] Filed: May 5, 1982

[51] Int. Cl.[4] ........................... H04N 3/10; G02F 1/09
[52] U.S. Cl. .................................... 358/213; 358/236; 350/356
[58] Field of Search ............... 358/209, 213, 225, 231, 358/232, 236, 241; 350/356, 361; 353/20

[56] References Cited

U.S. PATENT DOCUMENTS

| | | | |
|---|---|---|---|
| 3,938,878 | 2/1976 | Fox | 350/356 |
| 4,051,465 | 9/1977 | Brody | 358/236 |
| 4,389,096 | 6/1983 | Hori | 358/231 |

FOREIGN PATENT DOCUMENTS 1180334  4/1968  United Kingdom .

OTHER PUBLICATIONS

A Method of Matrix Addressing Polarization Rotating or Retarding Light Valve Arrays, by G. Taylor, Proceedings of the IEEE, vol. 58, No. 11, Nov. 1970, pp. 1812-1817.
X-Y Addressing Methods for Iron-Garnet Display Components, by B. Hill, IEEE Transactions on Electron Devices, vol. ED-27, No. 9, Sep. 1980, pp. 1825-1834.

Primary Examiner—Tommy P. Chin

[57] ABSTRACT

An improved magneto-optic image scanning detector for placement in a light beam between an image and a light detector generating an electrical signal as a function of the intensity of light impinging thereof. The signal-to-noise ratio is increased by mounting two chips of identical configuration in adjacent aligned relationship and scanning them in patterns whereby the light-blocking effect of non-selected areas is increased. Additionally, logic is provided in the driving circuit to alternate the current direction within the selected area to open and close each selected area during its portion of the scan pattern at a predetermined rate whereby the light beam passing therethrough is pulsated. A discriminator is added in line with the electric signal generated by the detector to produce an output as a function only of the pulsating portion whereby the d.c. background light is eliminated.

8 Claims, 21 Drawing Figures

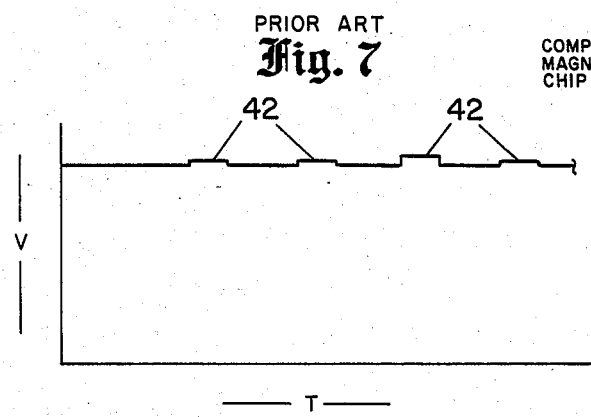
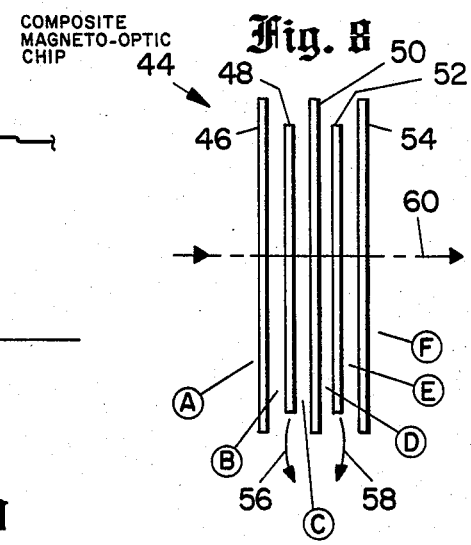
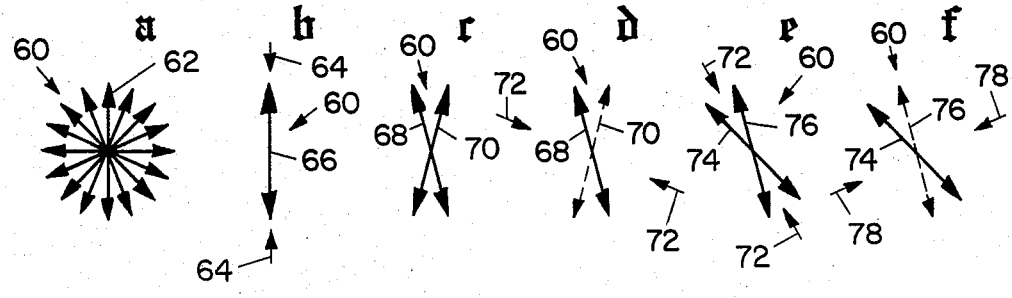
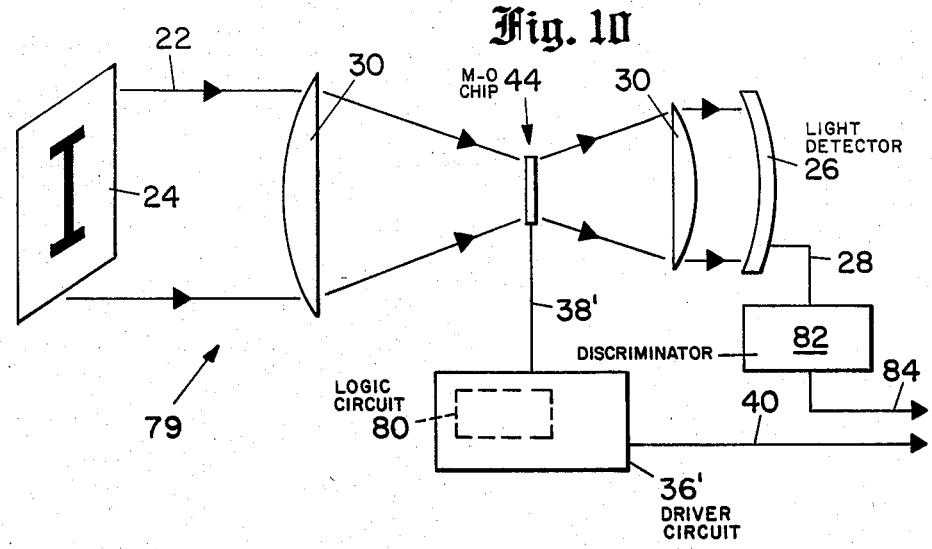

MAGNETO-OPTIC IMAGE SCANNING DETECTOR

BACKGROUND OF THE INVENTION

The present invention relates to optical image scanners and, more particularly, to solid state magneto-optic chips employed as a light valve in a beam of light operated in a raster-scan pattern to develop an output signal associated therewith.

Magneto-optic chips such as that indicated as 10 in FIG. 1 have been known in at least rudimentary form for some time. Several recent embodiments of such chips can be seen in detail in co-pending applications Ser. No. 320,819, filed Nov. 12, 1981 by B. E. MacNeal and W. E. Ross, titled ALTERING THE SWITCHING THRESHOLD OF A MAGNETIC MATERIAL and Ser. No. 375,327, filed on even date herewith by W. E. Ross, titled METHOD AND DEVICE FOR INCREASING THE DENSITY OF A PLURALITY OF SWITCHABLE MAGNETIC ELEMENTS both of which are also assigned to the assignee of the present invention. Basically, chip 10 comprises a substrate 12 having a film 14 thereon of garnet, or the like, which has the characteristic of being relatively transparent while, at the same time, being magnetizable into and out of the plane of film 14 as FIG. 1 is viewed. The film 14 is etched into a plurality of close adjacent posts 16. Typically, the posts 16 are in a rectangular pattern of rows and columns. Control wires are operably disposed between the posts 16 in the manner shown in simplified form in FIG. 2. For convenience, the rows are labelled R1–R6 and the columns are labelled C1–C6. Each column has a control wire 18 in the horizontal direction and a control wire 20 in the vertical direction associated with it. For convenience, the horizontal, or row, control wires 18 are labelled CR1–CR6 and the vertical, or column, control wires 20 are labelled CC1–CC6.

Referring now to FIG. 2 in combination with FIG. 3, magneto-optic chip 10 can be placed in the beam of light 22 between an image 24 and a light detector 26. Light detector 26 is of the type that produces an electrical output signal on its output line 28 which is proportional to the intensity of the light impinging upon it. Appropriate lenses 30 are interposed in the light beam 22 to pass the entire light beam 22 through the addressable areas of chip 10. A polarizer 32 is placed in the light beam 22 on one side of chip 10 and a polarization analyzer 34 is placed on the opposite side of the chip 10. A driver circuit 36 is operable connected to the wires 18, 20 by cable 38 and also provides a synchronization output on line 40. The film 14 further has the characteristic of rotating a polarized light beam from its entry axis alignment clockwise or counterclockwise, depending on the direction of the magnetization by what is known as the Faraday effect. As is well known, if polarized light is passed through polarizing film with axial alignment, virtually no blockage of the light will occur. By contrast, if a polarized light beam is attempted to be passed through a polarizing film having its axis at 90° to the polarization of the light, virtually no light will pass therethrough. The polarization analyzer 34 is a polarizing film. It is placed in alignment with the polarizer 32 such that polarized light from the polarazer 32 passing through the chip 10 which is rotated in one direction will come into closer alignment with the polarizing axis of the analyzer 34 while light rotated in the opposite direction will be driven further out of alignment with the axis of the analyzier 34. The posts 16 can be individually addressed by the wires 18, 20 in the manner of a computer memory; that is, if proper current flow is provided in wires CC3 and CR1, the post labelled R1, C3 can have its magnetization set in either direction desired without effect on the other posts.

Turning now to FIGS. 4, 5, and 6, it can be seen how a raster-scan pattern can be created using the chip 10 as a light valve. Assuming the chip 10 has all the posts 16 placed in blocking alignment except for the post 16 at position row 1, column 1 (R1, C1), the only light which should reach the light detector 26 is that corresponding to the upper lefthand corner position of the image 24. If the post 16 at position R1, C1 is placed in its light-blocking position and that at position R1, C2 is placed in the light-passing position by an appropriate current flow through wires CR1 and CC2, the light associated with the second position in the first row of the image 24 will be detected by the light detector 26 as shown in FIG. 5. The "open" position can then be moved to the third column of row 1 as shown in FIG. 6, and so forth, in the manner of a normal raster-scan. This is repeated over and over in the manner of such scans.

Such a basic system is not new in the art and, in fact, is disclosed in the British Pat. No. 1,180,334 by Ronald Ferguson Pearson and Herman Frederick Van Heek.

Such a basic approach would be viable and acceptable if the "on" post were transparent and the "off" posts were completely opaque. Such is not the case, however. The amount of rotation (i.e., Faraday effect) is a function of the color of the light and the thickness of the film. As a practical matter, therefore, the chips 10 are a compromise providing sufficient contrast between the "on" and "off" states that a visible and/or projectible image can be created thereby in the manner of a transparency. When used in the above-described application as a light valve for a scanning image detector or as a spatial filter, however, the chip 10 performs substantially as shown in FIGS. 4–6. The single scanning "on" post 16 is virtually transparent but the remaining "off" posts 14 are far from opaque. A significant amount of background or "noise" light will pass through the film 14 of chip 10 even if all the posts 16 are placed in the "off" state. The result is shown in the graph of FIG. 7 which represents voltage versus time. As can be seen, the detector 26 outputs, for example, 10 or 12 volts of DC background light signal while the changes in voltage indicated at 42 from the opening of a single post 16 to the passage of light therethrough is in the millivolt range. This can be understood when one realizes that even a small chip 10 as presently being tested by the assignee of this application is a grid of 48×48 posts for a total of 2304 posts. As can be easily calculated, each post contributes only slightly over 0.04 percent of the total area. With a relatively high background level of light passing through the remaining 2303 posts, the single open posts makes little difference.

Wherefore, it is the object of the present invention to provide an image-scanning system employing magneto-optic chips which have a high signal-to-noise ratio.

SUMMARY

The foregoing objectives have been met in a solid state optical image scanner wherein a magneto-optic chip having a plurality of areas alterable to pass or block light is disposed in a light beam between an image and a light detector and driven as a light valve to pass light through one area at a time in a scanning pattern to generate an electrical signal of interest by the improvement comprising altering each area during its time to pass light between the passing and blocking states at a pre-established frequency; detecting the pulsating light signal portion and separating it from the constant background steady light interference portion in the electric signal from the detector; and generating the output signal of interest as a function of the pulsating light signal portion.

To further increase the signal-to-noise ratio in the preferred embodiment, the light beam is passed through two identically patterned magneto-optic chips which are operated in corresponding scan patterns whereby the desired light passing area has two sequential light passing areas for free flow of light therethrough and the background area comprises two layers of blocking areas to minimize light passage therethrough to the detector.

In an alternative embodiment to simplify the amount of control wiring and logic required in a compromise background light rejection mode, the light beam is passed through two identically rectangularly patterned magneto-optic chips having rows and columns of light passing/blocking areas; one chip is driven in a horizontal scanning pattern passing light through all areas in a single column at a time; and the other chip is simultaneously driven in a vertical pattern of passing light through all areas in a single row at a time so that at any one time the light beam has one pair of overlapped light passing areas to pass through and at all other overlapped areas at least one of the areas is blocking the passage of light.

An improved chip construction is also utilized to allow a scan pattern wherein a single pair of control wires turns off the on-post and turns on the next adjacent off-post in the scan pattern simultaneously. Each post of the chip has low ansotropic areas in corresponding opposite corners. This causes low ansotropic areas for two diagonally adjacent posts to occur at the intersection of the two control lines. As a result, the current is flowing clockwise past the low ansotropic area of one of the posts and counter-clockwise past the adjacent low ansotropic area for the other post. This causes the desired off/on simultaneous switching.

Further, light-blocking improvements are incorporated into the chips either singly or in tandem to improve the light-blocking characteristics of the chip when used as a light valve in either scanning, display, or spatial filtering applications. In one case, the areas between posts are masked by a masking material to prevent stray light therethrough. In an alternate technique, two chips operated in tandem are offset in the X and Y directions such that the wiring of one acts as a mask to the areas between posts on the other.

DESCRIPTION OF THE DRAWINGS

FIG. 7 is a graph showing voltage versus time at the output of the light detector in the system of FIG. 3.

FIG. 8 is a simplified cross-section of a chip as employed in the present invention.

FIG. 9 is an end view of a light beam at the various stages of passing through the chip of FIG. 8 and showing the polarization alignment thereof.

FIG. 10 is a simplified drawing of an image scanning system according to the present invention.

DESCRIPTION OF THE VARIOUS EMBODIMENTS

Figure 1:
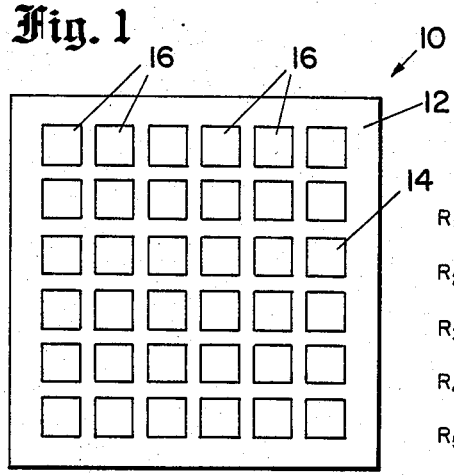
FIG. 1 is a plan view of a basic magneto-optic chip substrate and film etched into posts.
Figure 2:
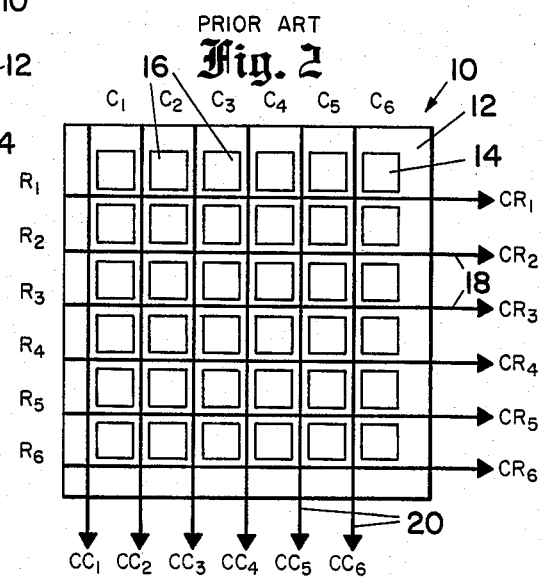
FIG. 2 is a plan view of the chip of FIG. 1 showing the connection of the control wires thereto and with the rows and columns designated for reference.

The present invention combines two modes of improvement. First, in the chip itself, the level of the background leakage light is reduced such that the light intensity change as a result of the post of interest being opened is in a more favorable ratio. Additionally, when operated as a scanner, the signal of interest is made easily identifiable and separable from the background light signal.

Turning first to FIG. 8, the chip of the present invention in one embodiment is shown in simplified cutaway side elevation. The chip, generally indicated as 44, is a composite chip containing, in sequence, a polarizer 46, a first magneto-optic chip 48, a first polarization analyzer 50, a second magneto-optic chip 52, and a second polarization analyzer 54. A first control cable 56 is operably connected to the first magneto-optic chip 50 and a second control cable 58 is operably connected to the second magneto-optic chip 52 for driving them by appropriate logic. As a light beam 60 passes through the chip 44 from left to right as FIG. 8 is viewed, the effect on the light beam 60 by the preferred orientation of the elements of chip 44 is shown in FIG. 9. The positions A-F are duplicated in FIG. 9. As FIG. 9 is viewed, it is as if the viewer were looking longitudinally down the light beam 60 of FIG. 8 from the righthand side as FIG. 8 is viewed. At position A, prior to the light beam 60 entering the chip 44, it is non-polarized; that is, light energy exists along varying axes as indicated by the arrows 62 of position A of FIG. 9. The polarizer 46 is polarized in a single axis as indicated by the arrows 64 of FIG. 9B. Accordingly, light beam 60 is polarized in the axis of the polarizer 46 as symbolized by the arrow 66. In passing through the first magneto-optic chip 48, light beam 60 is rotated partially clockwise and partially counterclockwise, depending upon the magnetization of the particular areas (posts) through which it passes. This is symbolized by the two arrows 68, 70 in FIG. 9C. The first polarization analyzer 50 has its axis of alignment as symbolized by the arrow 72 aligned at 90°, or crossed, with the one expected axis of unwanted light from the first magneto-optic chip 48 symbolized by the ghosted arrow 70 which is thereby diminished in intensity as symbolized in FIG. 9D. Any light rotated in the opposite (counter-clockwise) direction as symbolized by arrow 68 is transmitted with substantial intensity while its transmitted component takes on the direction of axis 72 of first polarization analyzer 50. In passing through the second chip 58, light beam 60 along the axis of first analyzer arrow 72 is once again rotated clockwise or counterclockwise by areas depending upon the direction of magnetization as symbolized by the arrows 74, 76 in FIG. 9E. The second polarization analyzer has its polarization axis aligned crossed at 90° with the expected alignment of unwanted arrow 76 as symbolized by the arrows 78 in FIG. 9F. Light in the alignment of arrows 76 is greatly reduced because of its misalignment with the axis 78 and any residual light corresponding to alignment axis 70 is virtually eliminated. As can be seen, therefore, the light of interest which corresponds to arrows 68 and 74 passes through while the background light aligned on axis 70 is virtually eliminated by the time light beam 60 emerges from the second polarization analyzer 54 as shown in FIG. 9F.

In the preferred embodiment for scanning, composite chip 44 is incorporated in a system generally indicated as 79 in FIG. 10. The combination of the previously described composite chip 44 and its operation in a particular manner within system 79 as to be described hereinafter, provides the maximized signal-to-noise ratio desired. It should be recognized that the chip 44 can be used by itself as well as the basic current reversal technique of the system of FIG. 10 with attendant benefit. The combination, however, is preferred and provides maximized benefit. Additional options and improvements are also shown later herein.

Figure 3:
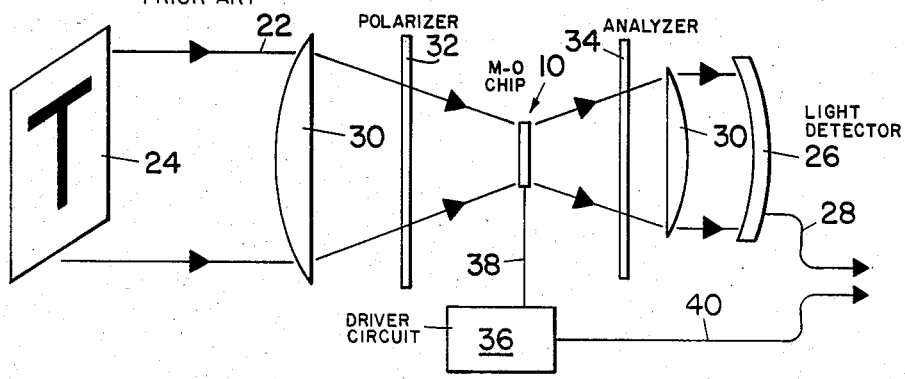
FIG. 3 is a simplified drawing showing a prior art technique for employing a chip such as that of FIG. 2 as a scanning light valve in an image scanning system.

As with the prior art system of FIG. 3, a light beam 22 from image 24 passes through lenses 30 to strike the detector 26 which creates an electrical output signal on line 28 as a function of the intensity of the light beam. The composite chip 44 according to the present invention includes its own polarizer 46 and two polarization analyzers 50, 54 such that the separate polarizer 32 and polarization analyzer 34 of FIG. 3 are omitted. To accomplish the objectives of the present invention, chip 44 is connected by cable 38' to the driver circuit 36 which includes additional logic circuits, to be described hereinafter, symbolized by the dotted box 80. Driver circuit 36 still provides a synchronization pulse on line 40. The output line 28 from the light detector 26 is connected to a discriminator 82 which provides an output 84 containing the signal of interest relative to the scanning of image 24 from the system 79 as a function of an a.c. component thereof. The driver circuit 36 is connected through cable 38' to control cables 56 and 58 which are connected, respectively, to the first and second magneto-optic chips 48, 52. Both chips 48, 52 could be operated simultaneously in combination with corresponding posts open to the passage of light one at a time on each of the chips 48, 52. By operating them in the manner to be described hereinafter, however, considerable saving is realized in the amount of addressing circuits which must be driven while providing performance with the signal-to-noise ratio at an acceptable level. Therefore, this approach is preferred. One chip is operably connected to be driven in the manner of the chip labelled 48 in FIG. 13. A horizontal pattern one column at time, is implemented. Thus, first all of column 1 is open to the passage of light while the remaining columns are blocked. Then, column 2 is opened and column 1 and the remaining columns are blocked, and so forth, seriatum. The second chip, 52, as shown in FIG. 14, is driven in a vertical scan pattern, one row at a time, in the same manner as the columns of chip 48. When overlayed, the result is as shown in FIG. 15; that is, one, and only one, coincident pair of posts as indicated at 86 are both in the condition to pass light therethrough. The remaining posts 88 in the row and column having the two passing posts 86 therein, have one post in its passing state and one post in its blocking state in coincidence. The remaining posts 90 have both coincident posts in their blocking state. In the embodiment previously mentioned having 48 rows and 48 columns for a total of 2304 posts, this means that one post is in its passing state, 94 posts are in their single blocked state, and 2209 are in their maximum blocking state with both coincident posts in the light-blocking state. Thus, almost 96% of the posts are in their maximum light-blocking state. To accomplish this type of scan, chip 48 needs only have the control wires for column addressing connected to it. Likewise, chip 52 needs only have the row addressing wires connected to it. Thus, the control connections normally required for one chip can be utilized for two chips.

Figure 11:
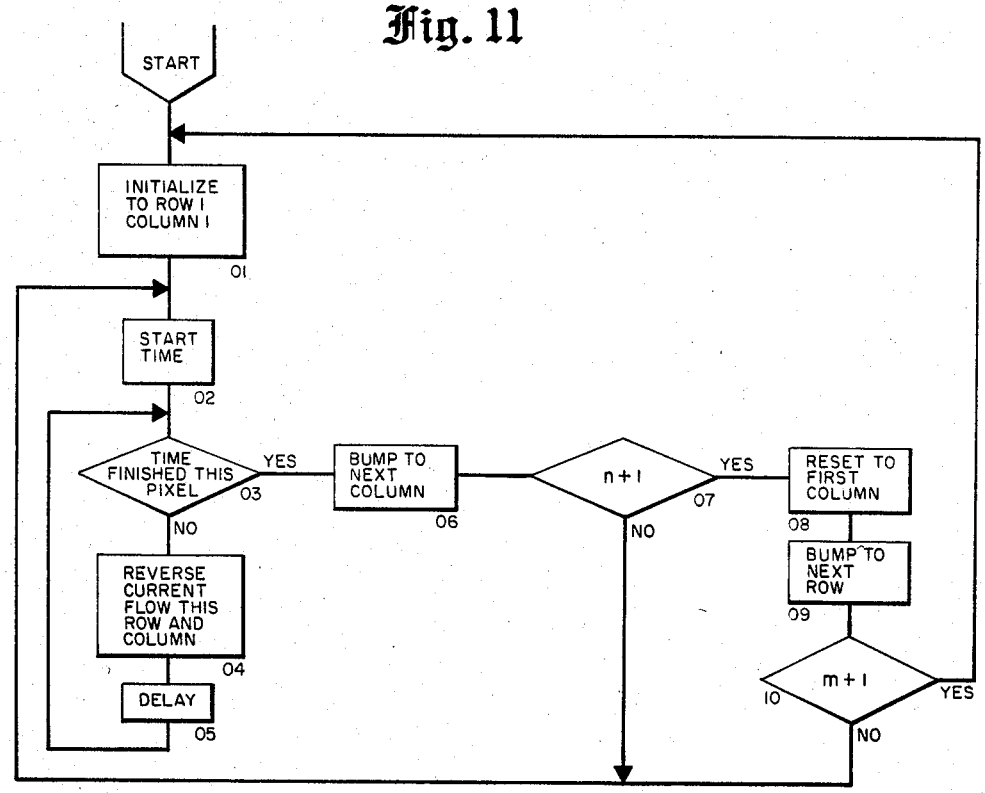
FIG. 11 is a logic flowchart showing the logic employed to create the scanning pattern in the preferred embodiment of the present invention.
Figure 13:
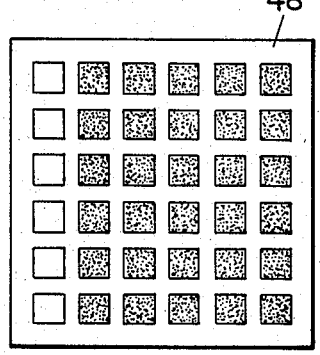
FIG. 13 shows the basic scanning pattern utilized in one chip of the present invention.
Figure 14:
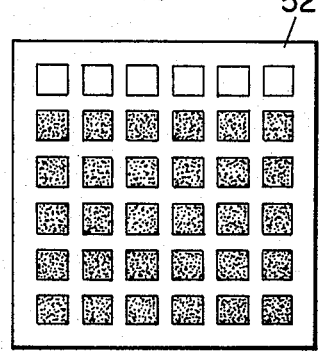
FIG. 14 shows the scanning pattern used in the second chip of the present invention.
Figure 15:
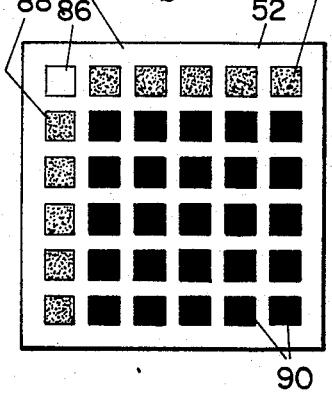
FIG. 15 shows the combined effect of the chips of FIGS. 13 and 14 when employed in combination in the present invention.
Figure 16:
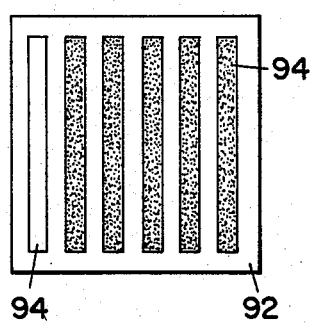
FIGS. 16 and 17 show an alternate approach to the bar and row scanning pattern of FIGS. 13-15. Instead of individual rows and columns of square posts, single long rectangular posts are provided occupying complete columns when oriented vertically as shown in FIG. 16 or complete rows when oriented horizontally as shown in FIG. 17.
Figure 17:
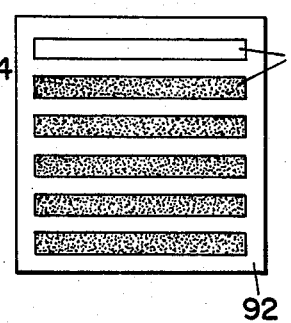

A possible variation in chip design to be used with the logic of FIG. 11 to perform in the manner of FIGS. 13-15 is shown in FIGS. 16 and 17. That chip 92 contains long rectangular posts 94 which cover the same areas as a row or column of posts in the chips 48 and 52 of FIGS. 13 and 14. A corresponding savings in the number of control wires is, of course, realized. One chip 92 is oriented with its posts 94 in a vertical pattern as shown in FIG. 16 and one is oriented in a horizontal position as shown in FIG. 17. They are then operated in the manner of chips 48 and 52 of FIGS. 13 and 14 to achieve the same results.

Figure 12:
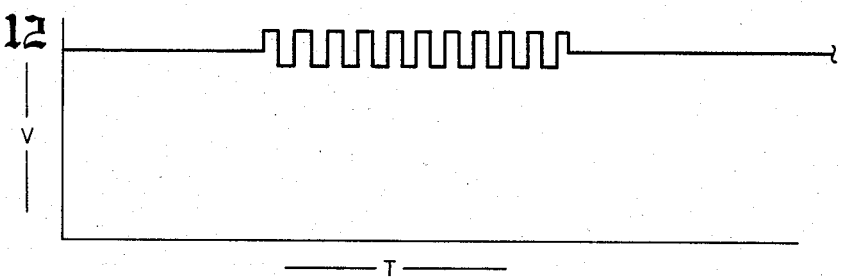
FIG. 12 is a graph of voltage versus time showing the preferred technique for creating the signal of interest whereby it can be readily identified from the background light signal.

Turning now to FIG. 11, a flow diagram to be incorporated within the logic 80 of driver circuit 36' in conjunction with chips 48 and 52 (or 92) to accomplish the objective of the present invention in its preferred embodiment is shown. At action block 01, the logic first initializes to begin at row 1 and column 1; i.e., the configuration of FIGS. 13-15. At action block 02, the logic starts a timer which is associated with each position in the raster-scan to be generated. At decision block 03, the logic next checks to see if the time allotted for this position (or pixel) of the scanned image is finished. If it is not, the logic continues to action block 04 where the current flow in the present row and column is reversed. This, of course, causes the magnetization to reverse and, correspondingly, the ability of the posts to pass light. At decision block 05, the logic next delays a fixed time and then transfers control back to decision block 03. The logic cycles through blocks 03–05 until the time for the pixel has been consumed. As will be realized, this action performs a solid state chopping function on the light beam passing through the pixel of interest. The effect is as shown in FIG. 12; that is, during the time the pixel is passing light intensity data to the light detector 26, it is alternatively switched between the passing and blocking state which creates an a.c. signal with respect to the light passing through that pixel. The discriminator 82 is tuned to select the frequency being impressed on the light beam by the solid state chopping action of the two chips 48, 52 and generates its output on line 84 as a function of only that a.c. signal.

Returning now to the logic of FIG. 11, once again, when the time is finished for a pixel at decision block 03, the logic transfers to action block 06. At that point, the logic bumps to the next column number. At decision block 07, the logic checks to see if the new column number as calculated is equal to the number of columns, "n", plus 1. If it is not, that means that it is still a legitimate column number within the chip 48 and the logic transfers control to block 02 to restart the timing sequence for the next pixel. When the decision block 07 finds that the column number just calculated at action block 06 is equal to n+1, it resets to the first column. At action block 09, the logic next bumps to the next row and, then, at decision block 10, checks to see if the newly calculated row number is equal to the number of rows, "m", plus 1. If not, it is a legal row number within chip 52 and control is once again transferred back to action block 02. When decision block 10 finds that the newly calculated row number is m+1, control is transferred to action block 01 to begin the raster scan once again.

Upon the initialization to row 1 and column 1, an appropriate synchronization signal could be output on line 40.

Figure 18:
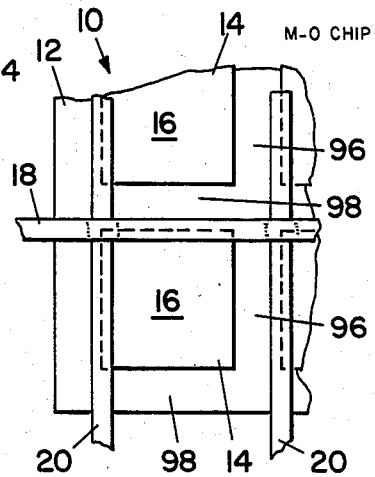
FIG. 18 is an enlarged detailed drawing of a single post area showing the way that the control wires are often placed which creates light emitting spaces between posts.

Turning now to FIG. 18, additional techniques within the scope of the present invention for improving the performance of a magneto-optic chip when used as a light filter in scanning, display and spatial filter applications can be understood. As is known and will be remembered from the brief description hereinbefore, the film 14 on the substrate 12 of chip 10 is divided into posts 16. This is typically done by removing the film 14 in the areas unoccupied by the posts 16. The horizontal control wires 18 and vertical control wires 20 are then affixed to the substrate 12 in a manner which will cause current flow therethrough to switch the one post 16 at the intersection of two wires 18, 20. To prevent switching of only one post 16, the posts 16 must be spaced apart a sufficient distance and the wires 18, 20 be thin enough and placed with respect to the posts 16 such as to concentrate intended magnetic fields from the flowing current into the post 16 of interest while being insufficient in strength in adjacent posts 16 to cause switching thereof. As a result, a space 96 of transparent substrate 12 exists between the wires 18, 20 and the posts 16 on two sides as can be seen in FIG. 18. In one technique according to the present embodiment as part of the reduction of the signal-to-noise ratio, a masking material 98 is deposited on the substrate 12 in spaces 96. The masking material 98 can be any opaque material which will adhere to the substrate 12 within the intended environment of use. A further technique when employed with simultaneous tandem chips as used in Figures 13 and 14 is to place the chips 48, 52 in offset alignment in both the X and Y direction. By so doing, the wires 18, 20 of one chip 10 are positioned over the space 96 of the next adjacent chip 10. Combining the two techniques, of course, provides two levels of stray light rejection with respect to the spaces 96.

Figure 4:
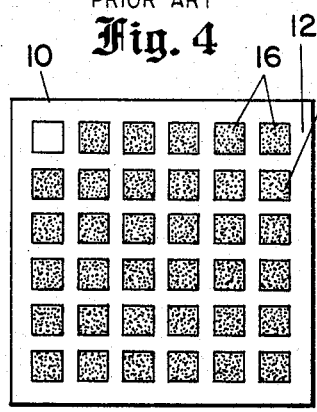
FIGS. 4-6 are simplified drawings of the chip of FIG. 2 showing the pattern of movement of the "open" post through the "off" posts to create a raster-scan pattern.
Figure 5:
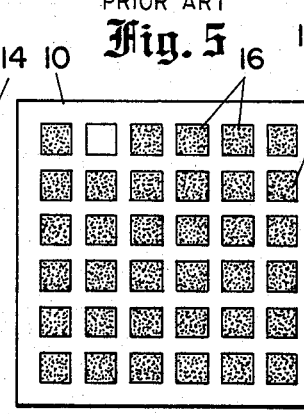
Figure 6:
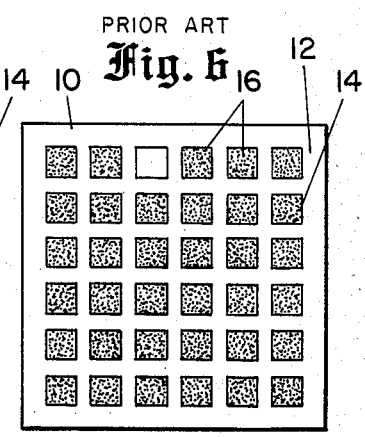
Figure 19:
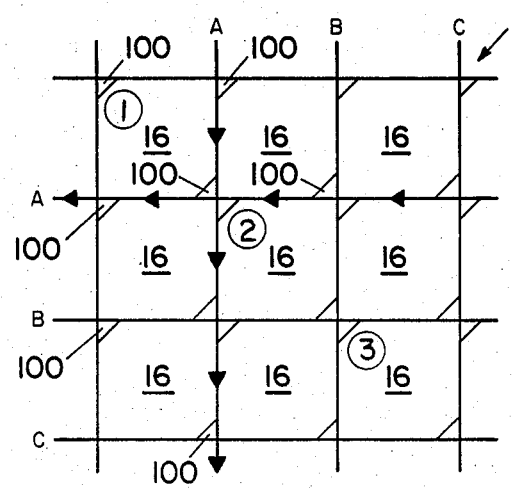
FIGS. 19 and 20 show the construction and operation of a chip in an alternate embodiment which allows adjacent posts in a scan pattern to be turned off and on simultaneously.
Figure 20:
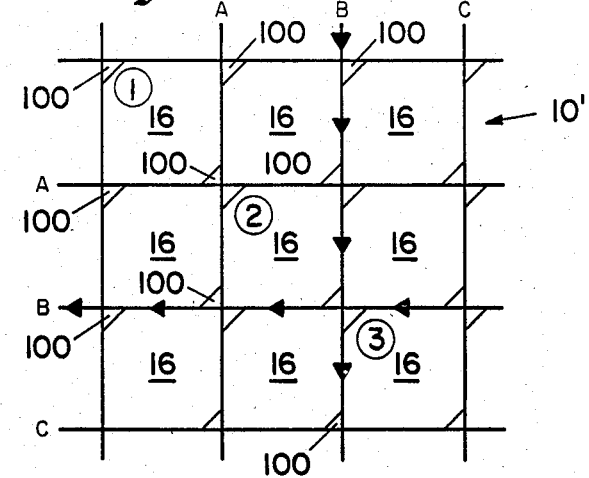

An improved method of chip construction for use primarily in scanning applications is shown in FIGS. 19 and 20 in simplified form. To aid in the switching of the posts 16, it is known to place low anisotropic areas adjacent the intersection of the control wires. It is also known to place low anisotropic areas in opposite corners across the diagonal of a post but in opposite corners on adjacent posts so that no interaction occurs. The duplication of low anisotropic areas in one post is for the purpose of redundancy in the operation of the device. By placing the low anisotropic areas identically in each of the posts, however, a unique scanning technique can be employed which reduces the heating through current while, simultaneously, allows increased scanning speeds. With brief reference to FIGS. 4–6, a typical approach to a scan pattern using magneto-optic chips is as shown therein. In FIG. 4, the post at row 1, column 1, is "on". To achieve the state of FIG. 5 wherein the post at row 1, column 2, is "on", a two-step operation is undertaken. First, a control pulse is sent to row 1, column 1, to turn the post "off". Then, a second control pulse is sent to turn the row 1, column 2, post "on".

Turning back to FIG. 19, again, chip 10' having posts 16 with low anisotropic areas 100 in the opposite diagonal corners is shown. If control current is passed through the two control wires A—A in the direction of the arrows, it can be seen that the current flow past the low anisotropic area 100 of the lower righthand corner of the post 16 designated as "1" as FIG. 19 is viewed, will be in the clockwise direction. At the same time, the current flow past the low anisotropic area 100 in the upper lefthand corner of the post 16 designated as "2" will be in the counter-clockwise direction. Assuming that clockwise is "off" and that counter-clockwise is "on", the current pattern of FIG. 19 will turn post #1 off and post #2 on.

Turning now to FIG. 20, if current flow is now accomplished in the pair B—B in the direction of the arrows, it can be seen that in one control output post #2 will be turned off and post #3 will be turned on. As can be seen, fewer current pulses are employed in this technique resulting in a reduction in the heating of the chip 10'. Also, since one action accomplishes two results, the scan rate can easily be doubled.

Figure 21:
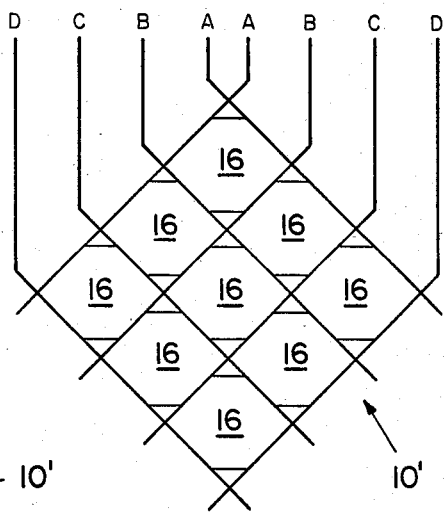
FIG. 21 shows the manner of orientation of the chip of FIGS. 19 and 20 to achieve a horizontal raster-scan pattern instead of a diagonal scan pattern as would be otherwise realized.

For those who wish to employ the chip design and scanning technique just described but with a raster-scan pattern in a horizontal direction, the chip 10' can be oriented in the manner shown in FIG. 21 to achieve this end.

Wherefore, having thus described my invention, I claim:

1. In a solid state optical image scanner wherein a magneto-optic composite chip having a plurality of areas alterable to pass or block light is disposed in a light beam between an image and a light detector and driven as a light valve in a scanning pattern both to pass light through selected areas as a desired light signal which generates a corresponding electrical signal of interest, and to block light through other selected areas that continue to pass constant background or noise light, the improvement to increase the light signal-to-background light noise ratio comprising:
  (a) altering each area between the passing and blocking states to pass light at a selected area at a predetermined frequency thereby generating a pulsating light signal portion;
  (b) detecting the pulsating light signal portion and the constant background steady light portion; and,
  (c) sensing the pulsating light signal portion and generating a corresponding electrical output signal of interest as a function thereof representative of the selected area.

2. The improvement of claim 1 in which the composite chip includes at least two magneto-optic chips, and additionally:
  (a) passing the light beam through the two magneto-optic chips; and,
  (b) operating said chips in corresponding scan patterns whereby the selected areas include two sequential light passing areas for free flow of the desired light signal therethrough and the other background areas include two sequential layers of light blocking areas to minimize light passage therethrough to the light detector.

3. The improvement of claim 2 in which the two magneto-optic chips have rows and columns, and additionally:
  (a) driving one chip in a first scanning pattern passing light through all areas in a single column at a time; and,
  (b) simultaneously driving the other chip in a second pattern passing light through all areas in a single row at a time so that at any one time the light beam has one pair of overlapped light passing areas to pass through and at all other overlapped areas at least one of the areas is blocking the passage of light.

4. The improvement of claim 3 and additionally:
offsetting the two chips with respect to one another in the row and column directions so that selected areas of one chip mask selected areas on the other chip.

5. The improvement of claim 3 and additionally:
masking selected areas of the chips to prevent light passage therethrough.

6. In a solid state optical image scanner having a magneto-optic composite chip disposed in a light beam between an image and a light detector to generate an electrical output signal as a function of the intensity of the light striking the chip and having driver logic connected to the chip for driving the chip in a raster-scan pattern, the improvement to increase the light signal-to-background light noise ratio comprising:
  (a) the driver logic including logic to open and close each addressable area of the chip at a fixed rate during its portion of the raster-scan pattern to pulsate the portion of the light beam passing therethrough at a fixed frequency; and,
  (b) discriminator means operably connected to receive the electrical output signal from the light detector at an input thereof for generating an output signal to be used as the output of the image scanner as a function of only the pulsating portion of the light beam at said fixed frequency thereby rejecting the background light noise contributed by undesired light passing through the chip.

7. In magneto-optic chip light valves employing a magneto-optic chip having a plurality of spaced posts individually addressable by control wires disposed therebetween and alterable to pass or block light passage, including background light passage, therethrough, the improvement to increase a light signal-to-background light noise ratio comprising:
adjacent ones of said spaced-apart posts having a first chip portion therebetween masked by the associated control wire to the passage of background light therethrough, and further having a second chip portion therebetween transparent to the passage of background light therethrough; and
blocking means associated with said second transparent chip portions to prevent the passage of background light therethrough.

8. In a magneto-optic chip having a plurality of spaced posts individually addressable by intersecting control wires disposed therebetween and alterable to pass or block light therethrough, the improvement for using the chip as a scanning light valve comprising:
  (a) two spaced-apart anisotropic areas identically positioned in each of the posts,
  (b) a respective one of said two areas in each of the posts positioned adjacent to a point of control wires intersection and the remaining associated one of said two areas positioned adjacent to another point of control wires intersection, and
  (c) said respective one of a first post oriented catercornered from said associated one of an adjoining second post at each of said control wires intersection so that electrical current through a selected control wires intersection will magnetize said first post in one direction and simultaneously magnetize said second post in the opposite direction.

* * * * *